United States Patent [19]

Campbell et al.

[11] Patent Number: 4,629,392
[45] Date of Patent: * Dec. 16, 1986

[54] SYSTEM FOR BATCH LOADING COAL INTO RAILROAD CARS

[75] Inventors: John A. L. Campbell; Carl L. Baldwin; David J. Foley, all of Oklahoma City, Okla.; Michael R. McHann, Memphis, Tenn.

[73] Assignee: Kerr-McGee Coal Corporation, Oklahoma City, Okla.

[ * ] Notice: The portion of the term of this patent subsequent to Jul. 17, 2001 has been disclaimed.

[21] Appl. No.: 631,278

[22] Filed: Jul. 16, 1984

[51] Int. Cl.[4] .............................................. B65G 67/22
[52] U.S. Cl. ...................................... 414/786; 141/94;
141/83; 141/192; 177/1; 177/25; 222/56;
222/64; 222/77; 414/21; 414/329
[58] Field of Search ................. 414/786, 21, 328, 329;
141/83, 98, 231, 232, 233, 94, 95, 96, 192, 198;
177/25, 122, 123, 59, 1, 163; 222/56, 77, 64

[56] References Cited

U.S. PATENT DOCUMENTS

| | | | |
|---|---|---|---|
| 2,696,606 | 12/1954 | de La Pomelie | 222/64 |
| 2,954,202 | 9/1960 | Bale, Jr. | 177/122 X |
| 3,393,757 | 7/1968 | Tonies | 177/25 X |
| 4,094,367 | 6/1978 | Jones et al. | 177/163 X |
| 4,284,380 | 8/1981 | Brumbaugh, Jr. et al. | 414/21 |
| 4,445,581 | 5/1984 | Caldicott | 177/163 |
| 4,460,308 | 7/1984 | Moon et al. | 414/21 X |

FOREIGN PATENT DOCUMENTS

| | | | |
|---|---|---|---|
| 661254 | 5/1979 | U.S.S.R. | 177/123 |
| 698885 | 12/1979 | U.S.S.R. | 414/328 |
| 814835 | 3/1981 | U.S.S.R. | 414/21 |

Primary Examiner—Frank E. Werner
Attorney, Agent, or Firm—William G. Addison

[57] ABSTRACT

A method for loading particles, such as coal, into a plurality of railroad cars wherein a control weight of a railroad car loaded with particles is established. Each of the railroad cars is weighed prior to loading particles into the railroad car from a weigh bin to determine an unfilled weight of each railroad car and the unfilled weight of each railroad car is compared with the control weight to determine an unfilled differential weight for each railroad car. The particles are loaded into the weigh bin from a surge bin and the surge bin is weighed as the particles are being loaded into the weigh bin from the surge bin so the loading of particles into the weigh bin can be terminated when a weight of particles has been loaded into the weigh bin about equal to and less than the unfilled differential weight associated with the railroad car to be loaded with the unfilled differential weight of particles.

17 Claims, 1 Drawing Figure

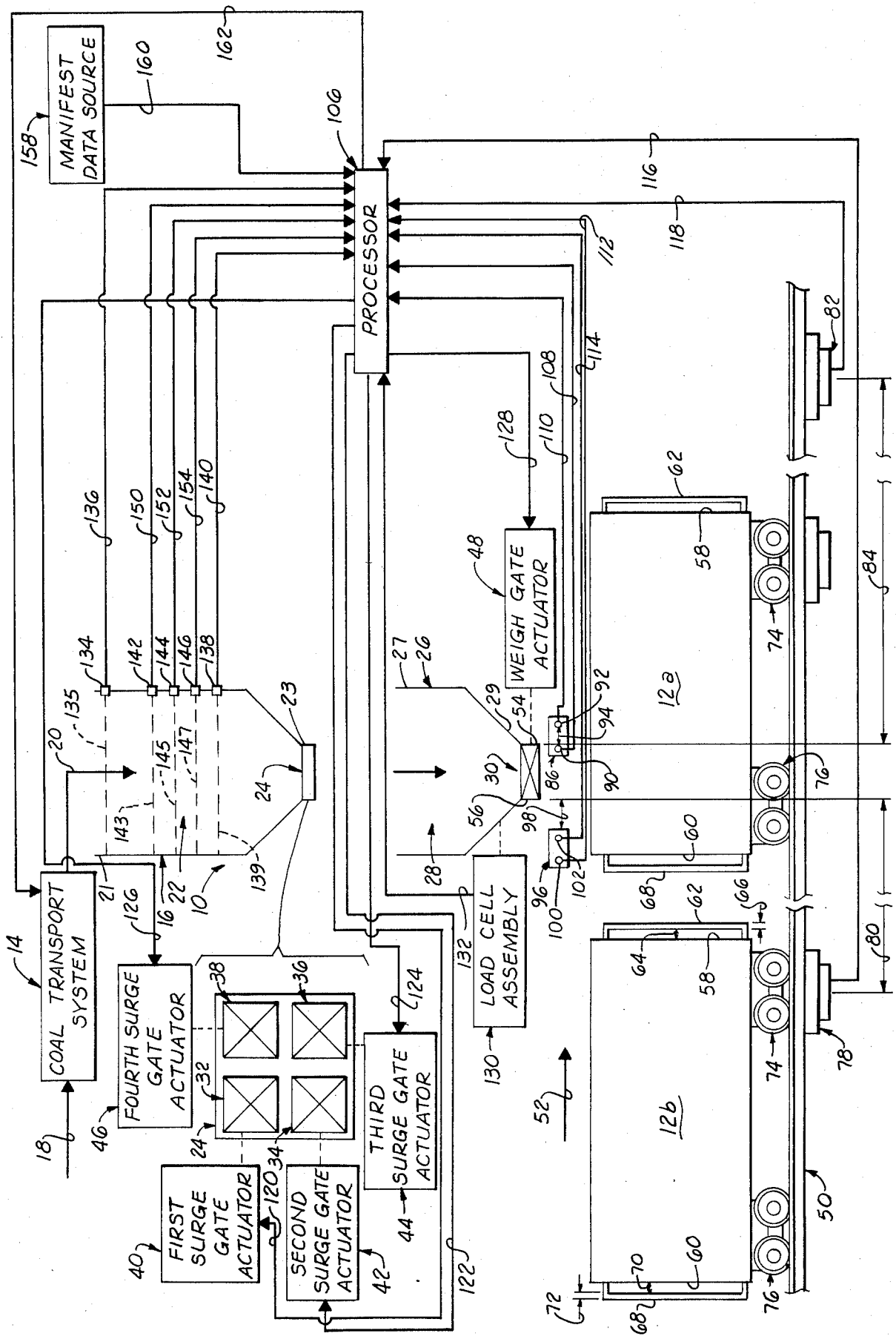

SYSTEM FOR BATCH LOADING COAL INTO RAILROAD CARS

CROSS REFERENCE TO RELATED APPLICATIONS

The subject matter in the present application is related to the subject matter disclosed in the co-pending application entitled "SYSTEM FOR LOADING COAL INTO RAILROAD CARS", U.S. Ser. No. 346,961, to be issued July 17, 1984, U.S. Pat. No. 4,460,308, and assigned to the Assignee of the present invention.

BACKGROUND OF THE INVENTION

1. Field of the Invention

The present invention relates generally to a system for loading coal into railroad cars and, more particularly, but not by way of limitation, to a system for batch loading coal into railroad cars so the filled weight of the railroad cars is closer to a predetermined control weight, including the controlling of the coal loaded into and discharged from the surge bin into the weigh bin.

2. Brief Description of the Drawing

The single FIGURE in the drawing is a diagrammatic, schematic view of the system of the present invention for batch loading coal into railroad cars, showing two railroad cars of a unit train with each railroad car being positioned in a different position with respect to the weigh bin utilized for loading coal into the railroad cars and diagrammatically showing the control system for controlling the coal loaded into and discharged from the surge bin into the weigh bin for controlling the weight of the coal loaded into the railroad cars.

DESCRIPTION OF THE PREFERRED EMBODIMENT

Shown in the drawing and designated by the reference numeral 10 is a system for batch loading coal or other particles into railroad cars 12, two railroad cars of a unit train being diagrammatically shown in the drawing and specifically designated by the reference numerals 12a and 12b. As noted, the system 10 is adapted for batch loading coal and other particles into railroad cars 12; however, the system 10 will be described below specifically with respect to the batch loading of coal into railroad cars and it specifically is understood that the term "coal" as used herein includes the other particles which may be loaded in accordance with the system 10 of the present invention.

A known maximum weight of a railroad car filled with coal generally is established, this maximum weight being referred to herein as the "predetermined control weight". If railroad cars are filled to an extent that the filled weight (the weight of the railroad car and the coal loaded therein), exceeds the predetermined control weight, this could have various undesirable affects on the companies responsible for filling such overweight railroad cars. On the other hand, if the filled weight of the railroad cars is substantially less than the predetermined control weight, revenues are reduced and the coal purchasers' costs are increased since less coal is shipped per unit train (a train consisting of a fixed numer of railroad cars). In addition, shipments can be delayed for the purpose of removing coal from overweight railroad cars which also results in an expense. The foregoing represent some of the reasons it is desirable to fill each railroad car with an amount of coal so that the filled weight of each railroad car is as close as possible to the control weight without exceeding the control weight. The system 10 of the present invention provides a method for batch loading coal into railroad cars 12 so the filled weight of each of the railroad cars 12 more closely approximates the control weight without exceeding the control weight.

The system 10 includes a coal transport system 14 which is adapted to transfer coal from a storage location and discharge the coal into a surge bin 16, the coal loading into the coal transport system 14 being indicated in the drawing by the arrow designated by the reference numeral 18 and the coal discharging from the coal transport system 14 into the surge bin 16 being diagrammatically indicated in the drawing by the arrow designated by the numeral 20. The coal transport system 14 is designed to move coal from the storage area and into the storage bin at controlled variable rates. For example, the coal transport system 14 may be a conveyor wherein the size of the conveyor is known and the speed at which the conveyor is moving is known and thus the rate at which coal is being discharged from the conveyor is a determinable rate which can be varied by varying the speed of the conveyor, for example.

The surge bin 16 has an upper open end 21 and a lower discharge end 23. The surge bin 16 includes a storage space 22 and the coal transport system 14, more particularly, is adapted to discharge coal through the open upper end 21 and into the storage space 22 of the surge bin 16.

The surge bin 16 also includes a surge gate assembly 24 which is connected to the discharge end 23 of the surge bin 16. The surge gate assembly 24 is in communication with the storage space 22. The surge gate assembly 24 has opened and closed positions and, in the closed position of the surge gate assembly 24, the coal is retained in the storage space 22 in the surge bin 16, the coal in the storage space 22 being discharged from the surge bin 16 through openings in the discharge end 23 in the opened position of the surge gate assembly 24. The surge gate assembly 24, more particularly, has a plurality of closed positions for controlling the rate at which coal is being discharged from the storage space 22 in the surge bin 16, in a manner which will be described in greater detail below.

The system 10 also includes a weigh bin 26 having an open upper end 27 and a lower discharge end 29. A storage space 28 formed in a portion of the weigh bin 26 and a weigh gate assembly 30 is operatively connected to the discharge end 29 of the weigh bin 26. The weigh gate assembly 30 has an opened and a closed position and the weigh gate assembly 30 is in communication with the storage space 28 in the weigh bin 26. In the opened position of the weigh gate assembly 30, coal is discharged from the storage space 28 through openings in the discharge end 29 of the weigh bin 26 and, in the closed position of the weigh gate assembly 30, coal is retained in the storage space 28 in the weigh bin 26.

In general, a predetermined weight of coal is discharged from the surge bin 16 into the weigh bin 26 and this predetermined weight of coal is retained within the weigh bin 26 until a railroad car 12 is properly positioned under the weigh gate assembly 30. When a railroad car has been properly positioned in a predetermined position beneath the weigh gate assembly 30, the weigh gate assembly 30 is moved to the opened position for discharging the predetermined weight of coal from the storage space 28 in the weigh bin 26 into the railroad car 12, during the operation of the system 10.

The surge gate assembly 24, more particularly, includes a first surge gate 32, a second surge gate 34, a third surge gate 36 and a fourth surge gate 38. Each of the surge gates 32, 34, 36 and 38 is in communication with the storage space 22 in the surge bin 16 and each of the surge gates 32, 34, 36 and 38 has an opened position and a closed position. Each of the surge gates 32, 34, 36 and 38 is operatively connected to the surge bin 16 so that coal is not discharged through the surge gates 32, 34, 36 and 38 in the closed position of the surge gates 32, 34, 36 and 38, and each of the surge gates 32, 34, 36 and 38 is operatively connected to the surge bin 16 so that coal is discharged from the storage space 22 through openings in the discharge end 23 of the surge bin 16 in the opened position of the surge gates 32, 34, 36 and 38.

A first surge gate actuator 40 is mechanically connected to the first surge gate 32. The first surge gate actuator 40 is adapted to move the first surge gate 32 to the opened position in response to receiving an open signal and to move the first surge gate 32 to the closed position in response to receiving a close signal.

A second surge gate actuator 42 is mechanically connected to the second surge gate 34. The second surge gate actuator 42 is adapted to move the second surge gate 34 to the opened position in response to receiving an open signal and to move the second surge gate 34 to the closed position in response to receiving a close signal.

A third surge gate actuator 44 is mechanically connected to the third surge gate 36. The third surge gate actuator 44 is adapted to move the third surge gate 36 to the opened position in response to receiving an open signal and to move the third surge gate 36 to the closed position in response to receiving a close signal.

A fourth surge gate actuator 46 is mechanically connected to the fourth surge gate 38. The fourth surge gate actuator 46 is adapted to move the fourth surge gate 38 to the opened position in response to receiving an open signal and to move the fourth surge gate 38 to the closed position in response to receiving a close signal. More particularly, the fourth surge gate actuator 46 is adapted to move the fourth surge gate 38 to any one of a plurality of predetermined partially closed positions in response to receiving one of a plurality of partially close signals, the fourth surge gate actuator 46 moving the fourth surge gate 38 to a predetermined partially closed position in response to receiving one of the partially close signals indicating the particular partially closed position to which the fourth surge gate actuator 46 is to move the fourth surge gate 38.

A weigh gate actuator 48 is mechanically connected to the weigh gate assembly 30. The weigh gate actuator 48 is adapted to move the weigh gate assembly 30 to the opened position in response to receiving an open signal and to move the weigh gate assembly 30 to the closed position in response to receiving a close signal.

The surge bin 16 is supported from the ground by a structure well known in the art, but not shown in the drawing, so that the discharge end 23 of the surge gate assembly 24 is disposed generally above the upper end 27 of the weigh bin 26 so coal can be discharged from the storage space 22 in the surge bin 16 into the storage space 28 in the weigh bin 26. The weigh bin 26 is supported from the ground by a structure well known in the art, but not shown in the drawing, so that the discharge end 29 of the weigh bin 26 is supported a predetermined distance above the ground so that, during the operation of the system 10, the discharge end 29 of the weigh bin 26 is disposed generally above the railroad cars 12 as the railroad cars 12 move along the track 50 in a direction of travel 52. In some applications, the weigh bin 26 may include two or more weigh gate assemblies with each weigh gate assembly being in communication with the storage space 28 in the weigh bin 26 for discharging coal from the weigh bin 26 in the opened position of such weigh gate assemblies. The discharge end 29 of the weigh bin 26, where the weigh gate assembly 30 is disposed, has a leading edge 54 and a trailing edge 56.

Surge bins for storing coal having surge gate assemblies for controlling the discharge of coal from storage spaces within the surge bin and weigh bins having weigh gate assemblies for discharging coal from storage spaces within the weigh bin are well known in the art and a detailed description of the surge bin 16, the weigh bin 26 and the weigh gate assembly 30 is not deemed necessary. Further, it is well known in the art to connect actuators to gate assemblies for opening and closing the gate assemblies and, thus, it is not deemed necessary to describe herein the details of the construction and the operation of the gate actuators 40, 42, 44, 46 and 48 and the connection of such actuators to the respective gates 30, 32, 34, 36 and 38.

Each of the railroad cars 12 is constructed in a conventional manner and each railroad car 12 has a leading end 58 and a trailing end 60. A front ladder 62 is connected to the leading end 58 of each railroad car 12 and each front ladder 62 is spaced a distance 64 from the leading end 58, each front ladder 62 having a ladder width 66 (the distance 64 and the ladder width 66 being shown in the drawing only in connection with the railroad cars 12b). A rear ladder 68 is connected to the trailing end 60 of each of the railroad cars 12 and each rear ladder 68 is spaced a distance 70 from the trailing end 60 of the railroad car 12, each rear ladder 68 having a ladder width 72 (the distance 70 and the ladder width 72 being shown in the drawing only in connection with the railroad car 12b).

Each of the railroad cars 12 is rollingly supported on the track 50 by a front wheel assembly 74 and a rear wheel assembly 76. A light weighing assembly 78 is disposed beneath the track 50 and is positioned a distance 80 in a direction, opposite the direction of travel 52, from the trailing edge 56 of the weigh bin 26. The light weighing assembly 78 is of the commercially available type generally referred to in the art as an in-motion track scale and is constructed and positioned beneath the track 50 to weigh a railroad car positioned on the track 50 above the light weighing assembly 78. In addition, the light weighing assembly 78 is constructed and adapted to provide an output signal which is indicative of the weight of the railroad car 12 weighed by the light weighing assembly 78.

A loaded weighing assembly 82 also is disposed beneath the track 50 and is positioned a distance 84 in the direction of travel 52 from the leading edge 54 of the weigh bin 26. The loaded weighing assembly 82 is of the commercially available type generally referred to in the art as an in-motion track scale and is constructed and positioned beneath the track 50 to weigh a railroad car 12 positioned on the track 50 above the loaded weighing assembly 82 while the railroad car 12 is moving in the direction of travel 52. The loaded weighing assembly 82 also is constructed and adapted to provide an output signal which is indicative of the weight of the railroad car 12 weighed by the loaded weighing assembly 82.

A leading edge sensor assembly 86 is disposed near the discharge end 29 of the weigh bin 26. The leading edge sensor assembly 86 is disposed a distance in the direction of travel 52 from the leading edge 56 of the discharge end 29 of the weigh bin 26 and the leading edge sensor assembly 86 is positioned to detect or sense the leading end 58 of the railroad cars 12 passing under the weigh bin 26. In one preferred embodiment and as shown in the drawing, the leading edge sensor assembly 86 is spaced a distance equal to zero from the leading edge 54 of the discharge end 29 of the weigh bin 26; however, in some applications it may be desirable to make this distance something other than zero.

The leading edge sensor assembly 86, more particularly, comprises a first and a second photocell 90 and 92. The first and the second photocells 90 and 92 are spaced apart a distance 94 which is slightly greater than the ladder width 66 or 72 plus the respective distances 64 and 70. The first photocell 90 is positioned to sense the leading end 58 of a railroad car 12 at a first predetermined position with respect to the discharge end 29 of the weigh bin 26 and the second photocell 92 is positioned to sense the leading end 58 of a railroad car 12 at a second predetermined position with respect to the discharge end 29 of the weigh bin 26.

The photocells 90 and 92 are positioned on one side of the track 50 and a pair of light sources (not shown) are positioned on the opposite side of the track 50 such that the railroad cars can pass between the photocells 90 and 92 and the light sources (not shown) as the railroad cars 12 travel along the railroad track 50 in the direction of travel 52. More particularly, one of the light sources (not shown) is aligned with the first photocell 90 and the other light source (not shown) is aligned with the second photocell 92. The photocells 90 and 92 each are constructed and adapted to detect or sense light received from the respective light sources (not shown) and each of the photocells 90 and 92 provides an output signal in response to an interruption of light provided by the respective light sources (not shown), the output signals sometimes being referred to herein as a first and a second signal, respectively, and the photocells 90 and 92 sometimes being referred to herein as a first and a second signal source, respectively. It also should be noted that laser beams and laser beam sensors could be used in lieu of the photocells and light sources, if desired in a particular application. Photocells and light sources of the type just described with respect to the photocells 90 and 92 are commercially available and a detailed description of the construction and operation of such is not deemed necessary herein.

A trailing edge sensor assembly 96 is disposed near the discharge end 29 of the weigh bin 26. The trailing edge sensor assembly 96 is spaced a distance 98 in a direction, opposite the direction of travel 52, from the trailing edge 56 of the weigh bin 26 and the trailing edge sensor assembly 96 is positioned to detect or sense the trailing end 60 of the railroad cars 12 passing under the weigh bin 26.

The trailing edge sensor assembly 96, more particularly, comprises a first photocell 100 and a second photocell 102. The first and the second photocells 100 and 102 are spaced apart a distance 104 which is slightly greater than the ladder widths 66 or 72 plus the respective distances 64 and 70, the distance 104 being the same as the distance 94 of the leading edge sensor assembly 86. The first photocell 100 is positioned to sense the trailing end 60 of a railroad car at a first predetermined position with respect to the discharge end 29 of the weigh bin 26 and the second photocell 102 is positioned to sense the trailing end 60 of a railroad car 12 at a second predetermined position with respect to the discharge end 29 of the weigh bin 26. The first and the second photocells 100 and 102 are positioned on one side of the track 50 and a pair of light sources (not shown) are positioned on the opposite side of the track 50 such that the railroad cars pass between the photocells 100 and 102 and the light sources (not shown) as the railroad cars 12 travel along the track 50. More particularly, one of the light sources (not shown) is aligned with the first photocell 100 and the other light source (not shown) is aligned with the second photocell 102. The photocells 100 and 102 each are constructed and adapted to detect or sense light from the respective light sources (not shown) and each photocell 100 and 102 provides an output signal in response to an interruption of light provided by the respective light sources (not shown), the output signal sometimes being referred to herein as a first and a second signal, respectively, and the photocells 100 and 102 sometimes being referred to herein as a first and a second light source, respectively. It also should be noted that laser beams and laser beam sensors could be used in lieu of the photocells and light sources, if desired in a particular application. Photocells and light sources of the type just described with respect to the photocells 100 and 102 are commercially available and a detailed description of the construction and operation is not deemed necessary.

The system 10 includes a processor 106 which can be a commercially available general purpose digital computer. The processor 106 is constructed and adapted to receive the leading edge sensor assembly 86 first and second output signals provided by the first and the second photocells 90 and 92, respectively, on respective signal paths 108 and 110, the trailing edge sensor assembly 96 output signals provided by the first and the second photocells 100 and 102 on signal paths 112 and 114, respectively, the light weighing assembly 78 output signal provided on a signal path 116, and the loaded weighing assembly 82 output signal provided on a signal path 118. The processor 106 provides the open and close output signals on signal paths 120, 122, 124 and 126 which are received by the first, the second, the third and the fourth surge gate actuators 40, 42, 44 and 46, respectively, and the processor 106 provides the open and the close signal on a signal path 128 which is received by the weigh gate actuator 48.

A load cell assembly 130 is mechanically connected to the weigh bin 26. The load cell assembly 130 is adapted to weigh the coal as the coal is being loaded into the storage space 28 of the weigh bin 26 and the load cell assembly 130 is adapted to provide an output signal on a signal path 132 indicative of the weight of the coal being loaded into the storage space 28 of the weigh bin 26. The load cell assembly 130 is a dynamic weighing system so that the output signal provided on the signal path 132 provides a continuous indication of the weight of the coal in the storage space 28 of the weigh bin 26 as the coal is being loaded into the storage space 28 of the weigh bin 26. The load assembly 130 comprises a plurality of load cells (the individiual load cells not being shown in the drawing) which are constructed and adapted to provide the output signal on the signal path 132 in the manner just described. Load cells which are adapted to be mechanically connected to bins and which provide output signals indicative of the weight of such bins are commerically available and a detailed description of the construction and operation of such load cells is not deemed necessary. The output signal provided by the load cell assembly 130 on the signal path 132 is received by the processor 106.

A high safety level sensor 134 is mechanically connected to the surge bin 16. The high safety level sensor 134 is adapted to sense the level of the coal in the storage space 22 of the surge bin 16 and to provide an output signal on a signal path 136 in response to sensing coal in the storage space 22 of the surge bin 16 at a predetermined high level. The level of the coal in the storage space 22 of the surge bin 16 sensed by the high safety level sensor 134 is indicated in the drawing by the dashed lines designated by the numeral 135.

The high safety level sensor 134 is positioned on the surge bin 16 to sense the level of coal in the storage space 22 of the surge bin 16 at the predetermined high level 135 generally near and spaced a distance from the upper end 21 of the surge bin 16. The high level 135 is set or determined to be a level at which, if the coal in the storage space 22 of the surge bin 16 reaches such high level 135, there is a serious malfunction within the system 10 necessitating the shutting off of the system 10. Thus, the level of the coal within the storage space 22 will not exceed the predetermined high level 135 by any significant degree, thereby preventing the coal from spilling over the upper end 21 which may result in equipment damage and personal injury.

A low safety level sensor 138 is mechanically connected to the surge bin 16. The low safety level sensor 138 is adapted to sense the level of the coal in the storage space 22 of the surge bin 16 and to provide an output signal on a signal path 140 in response to sensing coal in the storage space 22 of the surge bin 16 at a predetermined low level. The predetermined low level is indicated in the drawing by the dashed lines designated by the numeral 139, and this predetermined low level 139 is spaced a distance above the discharge end 23 of the surge bin 16 and is spaced a distance below the predetermined high level 135.

The low safety level sensor 138 is positioned on the surge bin 16 to sense the level of coal in the storage space 22 of the surge bin at the predetermined low level 139. The low level 139 is set or determined to be a level at which, if the coal in the storage space 22 of the surge bin 16 reaches such low level 139, there is a serious malfunction in the system 10 necessitating the shutting off of the system 10. The low level 139 is set or determined to be a level at which there is a low weight of coal in the surge bin 16 and this low weight of coal is above the weight of coal necessary to load the weigh bin 26 for loading coal into one railroad car 12 and below the weight of coal necessary to load the weigh bin 26 twice for loading coal into two railroad cars 12.

A first, a second, and a third control level sensor 142, 144 and 146 are mechanically connected to the surge bin 16 and positioned to sense the level of coal in the storage space 22 of the surge bin 16 at three predetermined control levels (indicated in the drawing by the three dashed lines designated by the numerals 143, 145 and 147, respectively) and each of the control level sensors 142, 144 and 146 is constructed and adapted to provide an output signal on a signal path 150, 152 and 154, respectively, in response to sensing the level of coal in the storage space 22 of the surge bin 16 at the control levels 143, 144 and 147, respectively. The signals on the signal paths 150, 152 and 154 provided by the control level sensors 142, 144 and 146, respectively, each are received by the processor 106.

It is difficult to sense the level of coal in the storage space 22 of the surge bin 16 in a continuous manner because of the angle of repose of the coal in the storage space 22 and the dust generated within the storage space 22 by the loading of the coal into the storage space 22, among other reasons. Thus, the three control level sensors 142, 144 and 146 cooperate to establish a control zone and the system 10 is adapted and operated to maintain the level of the coal in the storage space 22 of the surge bin 16 generally within the control zone established by the three control level sensors 142, 144 and 146.

During the operation of the system 10, the railroad cars move along the track 50 in the direction of travel 52 until the leading or first railroad car of a unit train passes over the light weighing assembly 78. Initially, the front wheel assembly of the first railroad car 12 passes over the light weighing assembly 78 and the light weighing assembly 78 weighs the load carried by the front wheel assembly 74 (the weight carried by the front wheel assembly 74 sometimes being referred to herein as the "front wheel weight"). The light weighing assembly stores the front wheel weight since the front wheel weight alone does not represent the total unfilled weight (the term "unfilled weight" as used herein means the weight of the railroad car 12 prior to loading coal into the railroad car 12 from the weigh bin 26 and this weight generally is the weight of the unfilled railroad car 12, although in some instances the railroad car 12 may have a portion of a prior load still present in the railroad car 12 prior to the loading of coal into the railroad car 12 from the weigh bin 26).

The railroad cars continue to move in the direction of travel 52 to a position wherein the rear wheel assembly 76 of the first or leading railroad car 12 passes over the light weighing assembly 76. In this position, the light weighing assembly 76 weighs the load carried by the rear wheel assembly 76 (this weight sometimes being referred to herein as the "rear wheel weight"), and the rear wheel weight of the first or leading railroad car 12 is stored in the light weighing assembly 78. The light weighing assembly 78 is constructed and adapted to add the stored front wheel weight of the leading or first railroad car to the stored rear wheel weight of the leading or first railroad car and to provide an output signal on the signal path 116 indicative of the sum of the front wheel weight and the rear wheel weight of the leading or first railroad car 12 in the unit train. The sum of the front wheel weight and the rear wheel weight of the first or leading railroad car 12 in the unit train is the unfilled weight of the leading or first railroad car 12 in the unit train, this being the weight of the railroad car 12 prior to the railroad car 12 being filled with coal from the weigh bin 26.

The output signal on the signal path 116 indicative of the unfilled weight of the first or leading railroad car 12 in the unit train is received by the processor 106. The control weight is stored in the processor 106 and the processor 106 is programmed to compare the unfilled weight with the control weight to determine an unfilled differential weight. The unfilled differential weight represents the maximum amount of coal which can be loaded into the first or leading railroad car in the unit train without exceeding the control weight. The processor 106 also is programmed to recognize that this is the first railroad car 12 in the unit train weighed by the light weighing assembly 78 and the processor 106 is programmed to associate a car identification indicating that this is the leading or first car weighed in the unit train with the associated unfilled differential weight. Thus, the processor has stored therein the car identification and the associated unfilled differential weight associated with that particular car identification.

The railroad cars 12 continue to move along the track 50 in the direction of travel 52 and each of the railroad cars 12 is weighed by the light weighing assembly 78, and the weight of each of the railroad cars 12 is compared with the control weight in the processor 106 to determine an unfilled differential weight which is stored in the processor 106 along with the associated car identification in a manner exactly like that described above with respect to the first or leading railroad car 12 in the unit train.

After determining the unfilled differential weight for the leading railroad car 12 in the unit train, the processor 106 is programmed to provide the open signals on the signal paths 120, 122, 124 and 126 to the first, the second, the third and the fourth surge gate actuators 40, 42, 44 and 46, respectively, for causing the first, the second, the third and the fourth surge gates 32, 34, 36 and 38 to be opened thereby resulting in coal being discharged from the storage space 22 in the surge bin 16. As the coal is discharged from the storage space 22 of the surge bin 16, the load cell assembly 130 continuously weighs the amount of coal being discharged into the storage space 28 of the weigh bin 26 and the load cell assembly 130 continuously provides an output signal on the signal path 132 indicative of the weight of the coal being loaded into the storage space in the weigh bin 26. The output signal provided by the load cell assembly 130 on the signal path 132 indicating the weight of the coal being loaded into the storage space 28 of the weigh bin 26 is received by the processor 106. When the load cell assembly 130 output signal on the signal path 132 indicates the weight of coal loaded into the storage space 28 of the weigh bin 26 to be equal to the unfilled differential weight, the processor 106 is programmed to provide the close signals on the signal paths 120, 122, 124 and 126 to the first, the second, the third and the fourth gate actuators 40, 42, 44 and 46, respectively, for causing the first, the second, the third and the fourth surge gates 32, 34, 36 and 38 to be moved to the closed position, thereby preventing further discharge of coal from the surge bin 16 into the weigh bin 26. Thus, in this condition, the weigh bin 26 now has stored therein an amount of coal equal to the unfilled differential weight determined for the first or leading railroad car in the unit train.

The railroad cars 12 continue to move along the track 50 in the direction of travel 52 to a position wherein the leading edge sensor assembly 86 senses or detects the leading end 58 of the first or leading railroad car 12 in the unit train and, in response to sensing the leading end 58 of the first or leading railroad car 12 in the unit train, the leading edge sensor assembly 86 provides an output signal on the signal paths 108 and 110. The processor 106 receives the signals on the signal paths 108 and 110 from the leading edge sensor assembly 86 indicating that the leading edge of the first or leading railroad car 12 in the unit train has been sensed or detected by the leading edge sensor assembly 86 and, in response to receiving such a signal, the processor 106 is programmed to provide the open signal on the signal path 128 to the weigh gate actuator 48. The weigh gate actuator 48 causes the weigh gate assembly 30 to be moved to the opened position in response to receiving the open signal from the processor 106 on the signal path 128 thereby causing the coal stored in the storage space 28 of the weigh bin 26 to be discharged through the discharge end 29 of the weigh bin 26. The coal is discharged through the discharge end 29 of the weigh bin 26 and into the first or leading railroad car 12 as the railroad cars 12 continue to move in the direction of travel 52 on the track 50.

The railroad cars 12 continue to move in the direction of travel 52 until the first or leading railroad car 12 in the unit train has been moved to a position wherein the trailing end 60 of the leading or first railroad car 12 in the unit train is sensed by the trailing edge sensor assembly 96. When the trailing edge sensor assembly 96 senses or detects the trailing end 60 of the first or leading railroad car 12 in the unit train, the trailing edge sensor assembly 96 provides an output signal on the signal path 114 indicating the detection of the trailing end 60 of the first or leading railroad car 12 in the unit train. The processor 106 is programmed to provide the close signal on the signal path 128 in response to receiving a signal on the signal path 114 indicating the detection of the trailing end 60 of the first or leading railroad car 12 in the unit train and the weigh gate actuator 48 moves the weigh gate assembly 30 to the closed position in response to receiving the close signal from the processor 106 on the signal path 128.

It should be noted that all of the coal in the weigh bin 26 may have been discharged from the storage space 28 through the discharge end 29 prior to the detection of the trailing end 60 of the first or leading railroad car 12 or some of the coal may still be in the storage space 28 of the weigh bin 26 when the trailing end 60 of the first or leading railroad car 12 is detected or sensed by the trailing edge sensor assembly 96 and, in either event, the detection of the trailing end 60 of the first or leading railroad car 12 by the trailing edge sensor assembly 96 results in the closing of the weigh gate assembly 30 thereby preventing further discharge of the coal stored in the storage space 28 of the weigh bin 26.

As mentioned before, each of the railroad cars 12 in the unit train is weighed by the light weighing assembly 78 and an unfilled differential weight along with the associated car identification is stored in the processor 106. Thus, after the filling of the first or leading railroad car 12 in the unit train and the closing of the weigh gate assembly 30, the processor then is programmed to provide the open signals on the signal paths 120, 122, 124 and 126 to the first, the second, the third and the fourth surge gate actuators 40, 42, 44 and 46 for causing the first, the second, the third and the fourth surge gates to be opened for discharging coal from the storage space 22 in the surge bin 16 into the weigh bin 26. In a manner exactly like that described before with respect to the first or leading railroad car 12, the processor 106 receives the signals from the load cell assembly 130 on the signal path 132 and when the signals from the load cell assembly 130 on the signal path 132 indicate that a predetermined weight of coal has been discharged into the storage space 28 of the weigh bin 26 equal to the unfilled differential weight for the next railroad car 12, the processor 106 again causes the close signals to be provided on the signal paths 120, 122, 124 and 126 for causing the first, the second, the third and the fourth surge gates 32, 34, 36 and 38 to be moved to the closed position. When the leading edge sensor assembly 86 senses the leading end 58 of the next railroad car 12, the processor 106 again provides the open signal on the signal path 128 to the weigh gate actuator 48 thereby causing the weigh gate assembly 30 to be opened for discharging the coal from the storage space 28 in the weigh bin 26 into the railroad car 12.

The processor 106 thus stores the unfilled differential weight of each railroad car 12 in the unit train along with the car identification identifying the particular railroad car 12 associated with each particular unfilled differential weight and the processor 106 controls the opening and closing of the first, the second, the third and the fourth surge gates 32, 34, 36 and 38 to dispose a weight of coal equal to the unfilled differential weight of the next railroad car 12 to be filled into the weigh bin 26. Then, when the railroad car 12 associated with the unfilled differential weight of coal disposed within the storage space 28 in the weigh bin 26 is detected by the leading edge sensor assembly 86 to be in a proper position beneath the weigh bin 26, the processor 106 is programmed to open the weigh gate assembly 30 for discharging this amount of coal into the particular railroad car 12.

During the loading operation, the railroad cars 12 continue to move along the track 50 in the direction of travel 52 to a position wherein the front wheel assembly 74 of each railroad car 12 passes over the loaded weighing assembly 82 and the loaded weighing assembly 82 weighs the load carried by the front wheel assembly 74 of each railroad car 12 (the weight sometimes being referred to herein as the "front wheel weight") and the front wheel weight is stored in the loaded weighing assembly 82. As mentioned before with respect to the light weighing assembly 78, the front wheel weight of the railroad car 12 alone does not represent the total filled weight of the railroad car 12. The railroad cars 12 continue to move in the direction of travel 52 on the track 50 until the rear wheel assembly 76 of the railroad cars 12 pass over the loaded weighing assembly 82. When the rear wheel assembly 76 of the railroad cars 12 passes over the loaded weighing assembly 82, the loaded weighing assembly 82 weighs the load carried by the rear wheel assembly 76 of each of the railroad cars 12 (the weight sometimes being referred to herein as the "rear wheel weight") and the rear wheel weight is stored in the loaded weighing assembly 82. The loaded weighing assembly 82 is constructed and adapted to add the stored front wheel weight to the stored rear wheel weight of each railroad car 12 and to provide an output signal on the signal path 118 indicative of the sum of the front wheel weight and the rear wheel weight of each of the railroad cars 12. The sum of the front wheel weight and the rear wheel weight of each of the railroad cars 12 is the filled weight of each of the railroad cars 12. The processor 106 is programmed and adapted to receive the signals provided by the loaded weighing assembly 82 and to compare the filled weight of each railroad car with the control weight to determine a filled differential weight for each of the railroad cars 12 and the filled differential weights along with the corresponding car identifications are stored in the processor 106.

The system 10 also includes a manifest data source 158 and the processor 106 is adapted to receive a signal on a signal path 160 from the manifest data source 158. Railroad cars generally are weighed and the unfilled weight of each of the railroad cars along with a railroad car identification generally is provided on a manifest associated with the unit train. Thus, the manifest already includes the unfilled weight of each of the railroad cars in the unit train. This information is stored in the manifest data source 158 and, with respect to each of the railroad cars 12 in the unit train being loaded by the system 10, the unfilled weight of each of these railroad cars can be provided to the processor 106 by way of the manifest data source 158 in lieu of the light weighing assembly 78. However, it is not uncommon for the unfilled weight contained on a manifest to be in error because of subsequent repairs made to particular railroad cars and, thus, it is preferable to determine the unfilled weight of each of the railroad cars in a unit train being loaded by the system 10 by way of the light weighing assembly 78, rather than utilizing the manifest data source 158.

In the system 10 of the present invention, it is important to load the weigh bin with a weight of coal equal to the determined unfilled differential weight as near as possible without exceeding the unfilled differential weight, so the filled weight of the railroad car is as near as possible to the control weight without exceeding the control weight. Thus, it is significant to control the unloading of coal from the storage space 22 in the surge bin 16 so the weight of the coal disposed in the storage space 28 in the weigh bin 26 is as near as possible to the unfilled differential weight without exceeding the unfilled differential weight for each of the railroad cars 12 to be loaded from the weigh bin 26.

The areas of the openings associated with the first, the second, the third and the fourth surge gates 32, 34, 36 and 38 of the weigh bin 16 have been enlarged to increase the amount of coal being discharged through such openings or, in other words, to increase the rate at which coal is being discharged through such openings from the storage space 22 in the surge bin 16. More particularly, the openings in the discharge end 23 of the surge bin 16 have been enlarged so that at least ten percent more coal is discharged through each opening in the discharge end 23 of the surge bin 16 as compared to the openings provided in the discharge end 23 of prior surge bins. Thus, in the open position of all of the surge gates 32, 34, 36 and 38, forty percent more coal is being discharged through the openings in the lower end 23 associated with such surge gates 32, 34, 36 and 38, as compared to the amount of coal being discharged through the openings in the discharge ends of prior surge bins.

During the loading of coal into the weigh bin 26, the processor, more particularly, is programmed initially to provide the open signal on all four of the signal paths 120, 122, 124 and 126 for opening all four of the surge gates 32, 34, 36 and 38. The processor 106 is programmed to provide the close signal on the signal path 120 to the first surge gate actuator 40 for causing the closing of the first surge gate 32 after a predetermined weight after the initial opening of all four of the surge gates 32, 34, 36 and 38. The processor 106 also is programmed to provide the close signal on the signal path 122 to the second surge gate actuator 42 for causing the closing of the second surge gate 34 after a predetermined period of time following the closing of the first surge gate 32. Also, the processor 106 is programmed to provide the close signal on the signal path 124 to the third surge gate actuator 44 for closing the third surge gate 36 after a predetermined period of time after closing the second surge gate 34. After a predetermined period of time from the closing of the third surge gate 36, the processor 106 is constructed to provide sequentially a plurality of close signals on the signal path 126 to the fourth surge gate actuator for causing the fourth surge gate 38 sequentially to be moved to a plurality of partially closed positions and finally for causing the fourth surge gate 38 to be moved to the completely closed position. The sequential closing of the first, the second, the third and the fourth surge gates 32, 34, 36 and 38 and the closing of the fourth surge gate 38 sequentially to a plurality of predetermined partially closed positions permits the system 10 to more accurately control the weight of the coal being discharged from the surge bin 16 into the weigh bin 26.

Using the enlarged openings in the discharge end 23 of the surge bin 16 and the controlling of the closing of the surge gates 32, 34, 36 and 38 in the manner described before, between about fifty percent and about seventy percent of the total weight of the coal to be loaded into the weigh bin 26 is discharged through the openings in the discharge end 23 of the surge bin 16 when all four of the surge gates 32, 34, 36 and 38 are in the opened position and between about sixty-five and about ninety-five percent of the total weight of coal to be loaded into the weigh bin 26 is discharged from the surge bin 16 when only the second, the third and the fourth surge gates 34, 36 and 38 are in the opened position. Further, between about eighty-five and about ninety-five percent of the total coal to be loaded into the weigh bin 26 from the surge bin 16 is discharged from the surge bin 16 when only the third surge gate 36 and the fourth surge gate 38 are in the opened position. Thus, after the closing of the first, the second and the third surge gates, 32, 34 and 36, between about eighty-five percent and about ninety-five percent of the total weight to be loaded into the weigh bin 26 has been discharged from the surge bin 16 into the weigh bin 26 thereby leaving only between about fifteen percent and about five percent of the total coal to be discharged into the weigh bin 26 to be discharged through the opening associated with the fourth surge gate 38 after the closing of the first, the second, and the third surge gates 32, 34 and 36.

In addition, the enlarged size of the openings in the discharge end 23 associated with the surge gates 32, 34, 36 and 38 cooperate so that between about eighty-five and about ninety-five percent of the total coal to be loaded into the weigh bin 26 has been loaded into the weigh bin 26 in a period of time of less than about eighty percent of the time required to load the same amount of coal utilizing the prior sized openings in the prior surge bins. Thus, the enlarging of the openings associated with the surge gates 32, 34, 36 and 38 permits more time for controlling the amount of coal to be discharged through the opening associated with the fourth surge gate 38 and thus the fourth surge gate 38 can be moved sequentially to the plurality of partially closed positions and finally to the closed position in a longer period of time for more accurately controlling the amount of coal to be discharged through the opening associated with the fourth surge gate 38. The moving of the fourth surge gate 38 sequentially to the plurality of partially closed positions and then to the closed position permits a more accurate control of the weight of coal being discharged from the surge bin 16 into the weigh bin 26 so that the total amount of coal discharged from the surge bin 16 into the weigh bin 26 can be brought closer to the predetermined desired unfilled differential weight for each of the railroad cars to be loaded utilizing the system 10 of the present invention, thereby providing a system 10 adapted to load the railroad cars so that the filled weight more nearly approximates the control weight without exceeding the control weight.

During the operation of the system 10, the coal transport system 14 is utilized to discharge coal into the surge bin 16 in the manner described before. In the event the level of the coal in the surge bin reaches the high level 135, the level of the coal in the surge bin 16 is detected or sensed by the high safety level sensor 134. When the level of coal in the surge bin is sensed by the high safety level sensor 134 to be at the high level 135, the high safety level sensor 134 provides an output signal on the signal path 136 indicating the level of coal in the surge bin to be at the high level 135. The processor 106 is programmed to receive the output signal provided by the high safety level sensor 134 on the signal path 136 and, in response to receiving such a signal, the processor 106 is programmed to provide a signal on a signal path 162 to the coal transport system 14 for shutting off the coal transport system 14 to interrupt the delivery of coal by the coal transport system 14 to the surge bin 21. In one embodiment, the high level 135 is set so there is sufficient volume remaining in the surge bin 16 to permit the coal transport system 14 to unload into the surge bin 16 the amount of coal which is in the coal transport system 14 at the time it is shut off.

If the level of the coal in the surge bin 16 drops to a level below the low level 139, the low safety level sensor 138 provides an output signal on the signal path 140 indicating the level of the coal in the storage space 22 of the surge bin 16 to be below the low level 139. The output signal on the signal path 140 indicating the level of the coal in the storage space 22 of the surge bin 16 to be below the low level 139 is received by the processor 106 and, in response to receiving such a signal, the processor 106 is programmed to provide a signal on the signal path 162 for shutting off the weigh gate actuator 64.

As mentioned before, the three control level sensors 142, 144 and 146 are positioned on the surge bin 16 to establish a control zone and the system 10 is operated to maintain the level of the coal in the storage space 22 of the surge bin 16 generally within the control zone or, in other words, generally between the control levels 143 and 149. Optimally, the level of the coal in the surge bin 16 is maintained at the intermediate control level 145; however, it is virtually impossible on a continuous basis to maintain the level of the coal in the storage space 22 of the surge bin 16 at the intermediate control level 145 and thus the system 10 of the present invention includes a control zone established by the control level sensors 142, 144 and 146.

If the coal level in the storage space 22 of the surge bin 16 falls below the intermediate level 145, the control level sensor 144 senses the dropping level of coal in the storage space 22 below the intermediate level 145 and provides an output signal on the signal path 152. The processor 106 is adapted to receive the signal on the signal path 152 provided by the intermediate control level sensor 144 indicating the level of coal within the storage space 22 of the surge bin 16 has dropped below the intermediate control level 145 and, in response to receiving such signal, the processor 106 provides an output signal on the signal path 162 for increasing the rate at which the coal transport system 14 is delivering coal to the surge bin 16. In response to receiving such a signal on the signal path 162, the coal transport system 14 is adapted to increase the rate at which the coal is being delivered into the storage space 22 of the surge bin 16 in an attempt to bring the level of the coal in the storage space 22 again to the intermediate control level 145.

If the level of the coal within the storage space 22 of the surge bin 16 increases from the intermediate level 145 to a position where the coal level in the storage space 22 reaches the upper control level 143, the control level sensor 142 senses the level of the coal in the storage space 22 and provides an output signal on the signal path 150. The processor 106 is constructed to receive the output signal on the signal path 150 indicating that the level of the coal in the storage space 22 of the surge bin 16 has been raised to the intermediate level and, in response to receiving such a signal, the processor 106 provides a signal on the signal path 162 to the coal transport system 14 for stopping or slowing the rate at which the coal transport system 14 delivers coal to the surge bin 16.

If the level of coal in the storage space 22 of the surge bin 16 falls below the lower control level 147, the lower or third control level sensor 148 provides an output signal on the signal path 154. In response to receiving a signal on the signal path 154 indicating the level of the coal within the storage space 22 in the surge bin 16 has dropped below the lower control level 147, the processor 106 provides an output signal on the signal path 162 for further increasing the rate at which the coal is being delivered by the coal transport system 14.

The processor 106 receives the signals from the control level sensors 142, 144 and 146 and the processor 106 is programmed to determine the time between receiving a control signal from any one of the control level sensors 142, 144 and 146 and receiving another signal from any one of the other control level sensors 142, 144 and 146. This differential period provides an indication of the rate at which the coal is being discharged from or filled into the storage space 22 of the surge bin 16. Based on this rate determined by the processor 106, the processor 106 provides various control signals on the signal path 162 for controlling the rate (increasing or decreasing) at which the coal transport system 14 is delivering coal to the storage space 22 in the surge bin 16.

Referring more particularly to the construction and operation of the leading edge sensor assembly 86, the leading end 58 of the railroad car 12 traveling in the direction of travel 52 first passes between the first photocell 92 and the cooperating light source (not shown) which results in a signal being produced on the signal path 108 indicating the leading end 58 has passed between the first photocell 90 and the cooperating light source (not shown), this signal being received and stored by the processor 106. As the railroad car 12 continues to travel in the direction of travel 52, the railroad car 12 moves to a position wherein the leading end 58 of the railroad car 12 passes between the second photocell 92 and the associated light source (not shown) which results in a signal being produced on the signal path 110 indicating the leading end 58 has passed between the second photocell 92 and the cooperating light source (not shown), this signal being received and stored by the processor 106. It is the transition of first receiving the signal from the first photocell 90 and then receiving the signal from the second photocell 92 which causes the processor 106 to determine that the leading end of the railroad car has been detected by the leading edge sensor assembly 86 and, in response to this determination, the processor 106 causes the open signal to be produced or provided on the signal path 128 for moving the weigh gate assembly 30 to the opened position permitting coal to be discharged from the weigh bin 26. If the processor 106 first receives the signal from the second photocell 92 and then receives the signal from the first photocell 90, the processor 106 is programmed not to cause the open signal to be provided since this sequence would indicate that the railroad cars 12 are moving in a direction generally opposite the direction of travel 52.

When the leading end 58 of the railroad car 12 traveling in the direction of travel 52 passes between the first photocell 90 and the cooperating light source (not shown), an electronic clock in the processor 106 is activated and, when the leading end 58 of the railroad car 12 then passes between the second photocell 92 and the cooperating light source (not shown), the electronic clock is deactivated, the electronic clock in the processor 106 then functions to provide an indication of the time required for the railroad car 12 to move the distance 94 between the first photocell 90 and the second photocell 92. The processor 106 cooperates with the electronic clock to determine the speed of the railroad cars 12 moving through the distance 94 in the time indicated by the electronic clock. The processor 106 is constructed not to provide the open signal on the signal path 128 which would open the weigh gate assembly 30, if the processor 106 determines that the railroad cars 12 are traveling at a rate of speed below a predetermined minimum speed. In addition, the processor 106 is constructed not to provide the open signal on the signal path 128 which would cause the weigh gate assembly 30 to be moved to the opened position if the processor 106 determines that the railroad cars 12 are traveling at a rate of speed above a predetermined maximum rate of speed. In one embodiment, it has been determined that the railroad cars should be determined to be traveling at a rate of speed of at least about one-half mile per hour and less than about one and one-half miles per hour before permitting the weigh gate assembly 30 to be moved to the opened position, as a safety measure.

Most railroad cars have ladders supported on the leading and trailing ends such as the ladders 62 and 68 on the railroad cars 12 shown in the drawing. The photocells 90 and 92 of the leading edge sensor assembly 86 are separated the distance 94 apart and the distance 94 is slightly larger than the ladder width 66 plus the distance 64 or the ladder width 72 plus the distance 70, although the distance 94 is not shown in scale to be larger in the drawings. When the railroad cars 12 are traveling in the direction of travel 52, the ladder 62 initially is interposed between the photocell 90 and the associated light source (not shown) and, subsequently, the ladder 62 is interposed between the photocell 92 and the associated light source (not shown). Since the distance 94 between the photocells 90 and 92 is greater than the ladder width 66 plus the distance 64, the leading end 58 will be interposed between the photocell 90 and the associated light source (not shown) before the ladder 62 is interposed between the photocell 92 and the associated light source (not shown). As the railroad cars 12 continue to move in the direction of travel 52, eventually the ladder 62 becomes interposed between the photocell 92 and the associated light source (not shown) and, at that time and for a brief period of time thereafter, the railroad car 12 and the ladder 62 simultaneously are interposed between the photocells 90 and 92 and the associated light sources (not shown); however, if the railroad car 12 quickly moves further in the direction of travel 52 to a position wherein the ladder 62 no longer is interposed between the photocell 90 and the associated light source (not shown) as the railroad cars 12 further move in the direction of travel 52, eventually the leading end 58 becomes interposed between the photocell 92 and the associated light source (not shown) and, at this time, the railroad car 12 is interposed between both photocells 90 and 92 and the respective light sources (not shown), this condition remaining true for some period of time as the railroad cars 12 move in the direction of travel 52. The processor 106 is constructed to provide the open signal on the signal path 128 only when the railroad car 12 has been interposed between both photocells 90 and 92 to assure the leading end 58 is being detected rather than the ladder 62.

Also, it should be noted that, if the weigh bin 26 inadvertently is filled with an amount of coal in excess of the unfilled differential weight, the processor 106 is programmed to determine the excess weight of coal in the weigh bin 26 by comparing the weight of the coal loaded into the weigh bin 26 with the unfilled differential weight. In response to determining an excess weight, the processor 106 then monitors the weight of the coal being discharged from the weigh bin 26 into the railroad car 12 and the processor 106 then provides the close signal on the signal path 128 to the weigh gate actuator 48 for causing the weigh gate assembly 30 to be closed in response to the load cell assembly 130 providing an output signal on the signal path 132 indicating the weight of the coal remaining in the weigh bin 26 is about equal to or slightly larger than the excess weight.

After the coal has been discharged from the weigh bin 26, the load cell assembly 130 then provides an output signal on the signal path 132 indicating the amount of coal remaining in the weigh bin 26 (the retained coal weight) under static conditions. The processor 106 is programmed to compare this retained coal weight with the excess weight so it can be determined if a railroad car 12 has been overfilled (filled to a weight in excess of the control weight).

The co-pending application entitled "System for Loading Coal into Railroad Cars", U.S. Ser. No. 346,961, to be issued July 17, 1984, U.S. Pat. No. 4,460,308, referred to before, disclosed and claimed a system for loading coal into railroad cars which included weighing assemblies like the light weighing assembly 78 and the load weigh assembly 82, gates and gate actuators like the weigh gate assembly 30 and the weigh gate actuator 48, a leading edge sensor assembly like the leading edge sensor assembly 86, and a trailing edge sensor assembly. The description contained in this co-pending application hereby is incorporated by reference.

Changes may be made in the steps or in the sequence of the steps of the methods described and claimed herein, and changes may be made in the construction and operation of the various parts or elements or assemblies described herein without departing from the spirit and scope of the invention as defined in the following claims.

What is claimed is:

1. A method for loading particles into a plurality of railroad cars wherein a control weight of a railroad car loaded with particles is established and wherein particles are discharged through a discharge end of a weigh bin and wherein a weigh gate assembly is connected to the discharge end of the weigh bin having an opened and a closed position, the particles being dischargable through the discharge end of the weigh bin in an opened position of the weigh gate assembly and the particles being prevented from being discharged from the weigh bin in a closed position of the weigh gate assembly, the railroad cars continuously moving under the weigh bin in a direction of travel, the method comprising the steps of:

weighing each railroad car prior to loading particles in the railroad car to determine an unfilled weight of each railroad car;

comparing the unfilled weight of each railroad car with the control weight to determine an unfilled differential weight for each railroad car and storing the unfilled differential weight of each railroad car along with an associated car identification determined sequentially prior to loading and uniquely identifying the particular railroad car associated with each unfilled differential weight;

loading particles into the weigh bin prior to unloading the particles from the weigh bin into the railroad cars;

weighing the weigh bin as the particles are being loaded into the weigh bin and terminating the loading of particles into the weigh bin when a weight of particles has been loaded into the weigh bin about equal to and less than the unfilled differential weight associated with the railroad car to be loaded with that unfilled differential weight of particles.

2. The method of claim 1 wherein the loading of the particles into the weigh bin is defined further to include the step of:

controlling the rate at which particles are being loaded into the weigh bin so at least between about eighty-five percent and about ninety-five percent of the particles to be loaded into the weigh bin are loaded in less than about eighty percent of a total time required to load the weigh bin with an amount of particles about equal to and less than the determined unfilled differential weight.

3. The method of claim 2 defined further to include the steps of:

sequentially reducing the rate at which particles are being loaded into the weigh bin, after the loading of at least between about eighty-five percent and ninety-five percent of the total weight of particles to be loaded into the weigh bin.

4. The method of claim 1 wherein each railroad car is defined further as having a leading end and a trailing end, and wherein the step of loading particles from the weigh bin is defined further to include the steps of:

sensing the leading end of each railroad car at a predetermined position with respect to the weigh bin; and opening the weigh gate assembly in response to sensing the leading end of each railroad car for discharging particles from the weigh bin.

5. The method of claim 4 wherein the step of sensing the leading end of each railroad car is defined further to include the steps of:

sensing the leading end of each railroad car at a first predetermined position with respect to the weigh bin; and sensing the leading end of each railroad car at a second predetermined position with respect to the weigh bin and spaced a distance in the direction of travel from the first predetermined position; and wherein the step of opening the weigh gate assembly is defined further as opening the weigh gate assembly in response to sensing the leading end of a railroad at the second predetermined position after first sensing the leading end of such railroad car at the first predetermined position.

6. The method of claim 5 wherein each of the railroad cars includes a front ladder, having a ladder width, which is connected to the leading end of each of the railroad cars, each ladder being spaced a distance from the leading end of one of the railroad cars, and wherein the step of sensing the leading end of each railroad car at the second predetermined position is defined further as sensing the leading end of each railroad car at the second predetermined position spaced a distance from the first predetermined position which distance is greater than the ladder width plus the distance of the ladder from the leading end of the railroad cars.

7. The method of claim 1 wherein each railroad car is defined further as having a leading end and a trailing end, and wherein the step of loading particles from the weigh bin is defined further to include the steps of:
  sensing the trailing end of each railroad car at a predetermined position with respect to the weigh bin; and
  closing the weigh gate assembly in response to sensing the trailing end of a railroad car for terminating the discharge of particles from the weigh bin.

8. The method of claim 1 wherein each railroad car includes a front wheel assembly and a rear wheel assembly and wherein the step of weighing each railroad car prior to loading the railroad car with particles is defined further to include the steps of:
  weighing the front wheel assembly of each railroad car prior to loading the railroad car with particles to determine a front wheel weight;
  weighing the rear wheel assembly of each railroad car prior to loading the railroad car with particles from the weigh bin to determine a rear wheel weight; and
  adding the front wheel weight and the rear wheel weight of each railroad car to determine the unfilled weight of each railroad car.

9. The method of claim 1 defined further to include the steps of:
  weighing the particles in the weigh bin in a static condition after loading the particles into the weigh bin;
  comparing the weight of the particles in the weigh bin with the unfilled differential weight for determining an excess weight in the event the weight of the particles in the weigh bin exceeds the unfilled differential weight;
  weighing the particles in the weigh bin while the particles are being discharged from the weigh bin; and
  closing the weigh gate assembly when the weight of the particles in the weigh bin is about equal to and slightly less than the excess weight.

10. A method for loading particles into a plurality of railroad cars wherein a control weight of a railroad car loaded with particles is established and wherein particles are discharged through the discharge end of a surge bin into a weigh bin and wherein the particles in the weigh bin are discharged through a discharge end of the weigh bin for loading the particles into the railroad cars, the surge bin having a surge gate assembly having an opened position and a closed position and the particles being dischargable through the discharge end of the surge bin in the opened position of the surge gate assembly and the particles being prevented from being discharged through the discharge end of the surge bin in the closed position of the surge gate assembly and wherein the weigh bin includes a weigh gate assembly having an opened and a closed position, the particles being dischargable through the discharge end in the weigh bin in the opened position of the weigh gate assembly and the particles being prevented from being discharged through the discharge end in the weigh bin assembly in the closed position of the weigh gate assembly, and wherein the railroad cars continuously move under the weigh bin in a direction of travel, the method comprising the steps of:
  weighing each railroad car prior to loading particles into the railroad car from the weigh bin to determine an unfilled weight of each railroad car;
  comparing the unfilled weight of each railroad car with the control weight to determine an unfilled differential weight for each railroad car and storing the unfilled differential weight of each railroad car along with an associated car identification determined sequentially prior to loading and uniquely identifying the particular railroad car associated with the unfilled differential weight;
  opening the surge gate assembly for discharging particles into the weigh bin prior to loading particles from the weigh bin into the railroad cars; and
  weighing the weigh bin as the particles are being loaded into the weigh bin from the surge bin and closing the surge gate assembly when a weight of particles has been loaded into the weigh bin about equal to and less than the unfilled differential weight associated with the railroad car to be loaded with the unfilled differential weight of particles.

11. The method of claim 10 wherein the loading of the particles into the weigh bin is defined further to include the step of:
  controlling the closing of the weigh gate assembly for controlling the rate at which particles are being discharged from the surge bin so that at least between about eighty-five and ninety-five percent of the particles to be loaded into the weigh bin are loaded in less than about eighty percent of the total time required to load the weigh bin with an amount of particles about equal to and less than the determined unfilled differential weight.

12. The method of claim 11 defined further to include the step of:
  sequentially reducing the rate at which particles are being loaded into the weigh bin, after the loading of at least between about eighty-five percent and ninety-five percent of the total weight of particles to be loaded into the weigh bin.

13. The method of claim 10 defined further to include the steps of:
  loading particles into the surge bin; and
  sensing the level of particles in the surge bin at a predetermined high level and terminating the loading of particles into the surge bin when the level of the particles in the surge bin reaches the predetermined high level.

14. The method of claim 13 defined further to include the step of:

sensing the level of the particles in the surge bin at a predetermined low level in the surge bin and terminating the loading of particles into the weigh bin when the level of particles in the surge bin reaches the predetermined low level, the predetermined high level in the surge bin being positioned generally near an upper end of the surge bin and the predetermined low level in the surge bin being spaced a distance from the predetermined high level and generally near and spaced a distance from the discharge end of the surge bin.

15. The method of claim 10 defined further to include the steps of:

loading particles into the surge bin;

sensing the level of the particles in the surge bin at at least three predetermined spaced apart control levels, an upper control level, an intermediate control level and a lower control level;

increasing the rate at which the particles are being loaded into the surge bin in response to sensing the level of particles in the surge bin falling below the intermediate control level; and decreasing the rate at which the particles are being loaded into the coal bin in response to sensing the level of particles in the surge bin moving above the intermediate control level.

16. The method of claim 15 defined further to include the steps of:

determining the period of time between sensing the level of particles in the surge bin at the intermediate control level and sensing the level of the particles in the surge bin at the lower control level to determine the rate at which the level of particles is being lowered in the surge bin;

controllingly raising the rate at which particles are being loaded into the surge bin in response to determining the rate at which the level of particles in the surge bin is being lowered;

determining the differential period of time between sensing the level of particles in the surge bin at the intermediate control level and the sensing of the level of the particles in the surge bin at the upper control level to determine the rate at which the level of particles in the surge bin is rising; and controllingly lowering the rate at which particles are being loaded into the surge bin in response to the determination of the rate at which the level of the particles in the surge bin is rising.

17. The method of claim 10 defined further to include the steps of:

weighing the particles in the weigh bin in a static condition after loading the particles into the weigh bin;

comparing the weight of the particles in the weigh bin with the unfilled differential weight for determining an excess weight in the event the weight of the particles in the weigh bin exceeds the unfilled differential weight;

weighing the particles in the weigh bin while the particles are being discharged from the weigh bin; and closing the weigh gate assembly when the weight of the particles in the weigh bin is about equal to and slightly less than the excess weight.

* * * * *